Patented June 9, 1925.

1,541,607

UNITED STATES PATENT OFFICE.

HEINRICH ZOELLY, OF ZURICH, SWITZERLAND.

BELT TRANSMISSION GEAR.

No Drawing.  Application filed March 21, 1923. Serial No. 626,581.

*To all whom it may concern:*

Be it known that I, HEINRICH ZOELLY, a citizen of the Republic of Switzerland, residing at Zurich, Switzerland, have invented certain new and useful Improvements in Belt Transmission Gears, of which the following is a specification.

This invention relates to improvements in power-belt-transmission gears, particularly suited for high speed ratios and high circumferential velocities.

In order to be able to transmit large powers by means of an endless band or belt running over pulleys the cross-sectional area and the velocity of this band must be great. In most cases the width of the belt dare not exceed, however, a determined limit as other given conditions have to be considered. Further, too great a thickness of the band or belt causes the latter to become stiff so that it is subjected to great bending stresses when running over the pulleys. From these reasons the cross-sectional area of the band cannot be chosen at will. On the other hand the running speed of the bands utilized heretofore cannot be chosen very high as the material of the band would be stressed too much by the centrifugal forces so that only small pulling forces and therefore small outputs could be transmitted by such a band in spite of the high speed. When the influence of the centrifugal force and of the bending force is taken into account, it is known that the maximum tensile stress $\sigma_z$ in an endless band running over pulleys consists of the three components indicated in the following. If one proceeds, for example, from the calculation contained in Bach "Die Maschinenelemente", 10th edition, 1908, page 403, the following modified equation 337 results by introducing into the latter the bending stress $\sigma\beta$, which is derived from:

$$\beta = \frac{d}{2r_1} \cdot E,$$

wherein $d$ is the thickness of the band, $r_1$ the radius of the driving pulley and $E$ Young's modulus, and bearing in mind at the same time that $s_1 = \sigma_z \cdot f$, then:

$$\sigma_z = \frac{P}{f} \cdot \frac{e^{\mu\omega}}{e^{\mu\omega}-1} + \gamma \frac{v^2}{g} + \frac{d}{2r_1} \cdot E$$

wherein P is the circumferential force, $f$ is the cross-section of the belt; $e$ is the base of the natural logarithms, $\mu$ is the coefficient of friction between belt and pulley; $\omega$ is the central angle defining the arc of engagement between belt and pulley; $\gamma$ is the specific gravity of the belt material; $v$ is the circumferential velocity of the belt pulley and $g$ is the acceleration due to gravity.

The smaller the second and third terms of this sum are, the larger is the power which can be transmitted by the band. The magnitude of the second term depends on the running speed and on the specific gravity of the material of the band, and that of the third term depends mainly on Young's modulus for the material and on the thickness of the band.

When the running speed of the band is high and when the band is made of a material with a high specific gravity, considerable forces must be brought to act on the band in order to counteract the influence of the centrifugal forces and to effect that the band lies properly on the pulleys. For this purpose it has already been proposed to subject the band to the action of vacuum to suck it towards the driving pulley. This method, however, only permits of attaining a pressure of at the utmost 1 kilogram per square-centimetre (14.2 lbs. per sq. in.) by which the band is pressed against the pulley. According to another proposal a steel band is caused to bear against the driving or driven pulleys by means of magnets. However, as the steel band must be thin, a small number of magnetic lines of force can only be sent through it. In this way, which otherwise brings essential advantages, for instance that the driven part of the band may sag freely, a pressure amounting not to more than 2.5 kilograms per square-centimetre (35.5 lbs. per sq. in.) may be obtained. On the other hand, pressures up to 10 kilograms per square-centimetre drawing the band towards the pulleys may be obtained when a band drive of this type is arranged in a closed casing and when a strong current of air causes the band to bear on the pulleys. The constructional difficulties with a gear of this type are however so great that such gears or drives are not extensively used in practice. The difficulties become still greater when the linear speeds of the band are high.

For high linear speeds of the band, for instance for speeds of above 35 metres (114.8 ft.) per second, all the known means intended to counteract the centrifugal forces fail. Consequently the forces causing a tightening of the band and which are necessary in order to press the band against the pulleys, i. e. the second and the third term of the right side of the above equation, increase so much that the band cannot be utilized for useful power transmission purposes. The more so, when the transmission ratios of the band drive are large, as in this case the bending stresses to which the endless band is subjected, are particularly great, which is the moreover detrimental as a continuous change in the direction of the bending occurs. In order to overcome this drawback it has already been proposed to make the bands used for power transmission purposes from fibrous material. Bands of this type have been so manufactured that the completely open fibres are arranged in the direction in which the pull occurs, or the fibres have been twisted together Further bands or belts have been manufactured consisting of a plurality of layers of fabric arranged one above the other. Up till now these bands have been manufactured from fibrous fabrics which had either too great a specific gravity or which had too small a flexibility and elasticity in order to be suitable for the transmission of large outputs at high speeds and with large transmission ratios. In the case in which open fibres have been used the latter have been held together by means of a binding solution, preferably a rubber solution. But such binding agents detach themselves very soon on account of the continuously changing binding stresses and the varying flexibility and elastic expansion or elongation of the fabrics, as well as on account of the varying coefficients of extension by heat of these materials, so that bands or belts of this type have not proven successful. Belts of cotton, hemp, camel-hair and the like present the disadvantage that the length of the individual fibres is short. This has a prejudicial effect on the tensile strength; further such belts, when running at high speeds, are subject to considerable wear and tear because the short fibres are very soon weakened by the continuously changing direction in which the bending occurs, and owing to the considerable air resistances the short projecting fibres are soon pulled out of the fabric so that its texture is loosened and thus weakened. Steel bands having a high tensile strength present the disadvantage that they are subjected to excessive bending stresses and that they have a too high specific gravity so that they are also subjected to great centrifugal stresses when running at high linear speeds. Band drives have furthermore been manufactured in which the advantages inherent to the belts and bands made of leather, rubber, balata, cotton, hemp, camel-hair and the like, are united with those of steel bands and steel wire ropes. Drives of this type are manufactured of metallic wires and fibrous fabrics, a large number of thin metallic wires being twisted to a thin wire thread and such threads acting as warp threads woven with fibrous material acting as weft threads into a band. However, these band drives are not suitable for the transmission of large outputs at high speeds and large ratios owing to their high specific gravity.

Now, in order to be able to transmit large powers at high speeds, with a determined width of band in power transmission gears having at least one endless band running over pulleys, the band consists of a fabric of which the ratio between the breaking tensile strength in kilograms per square-millimetres and the specific gravity (compared to that of water, i. e. in kilograms per cubic decimetre) amounts to at least 30 $(1.18 \times 10^6)$, and which possesses great tensile strength, great flexibility and great elasticity as well as a technical length of fibres of at least 80 centimetres, so that with such a band, which is only subjected to small stresses caused by the bending and the centrifugal action and to a small fraying out when running at high speeds, large forces may be transmitted per unit of width. One of the most suitable fibres out of which such a band can be manufactured is silk, which has great elasticity and flexibility and a practically unlimited length of fibres so that it will readily lie snugly to the smaller pulley and does not fray. Such a band is, practically speaking, not subjected to any bending stresses even when moving at high speeds, and owing to the small specific gravity of the fabric the third term of the right half of the equation given above is very small as compared with the first term even with great speeds so that the band may yet be subjected to great forces acting in the circumferential direction. Preferably spun and slightly twined silk threads may be reeled side by side or above each other for forming the endless band. The silk threads reeled to an endless band may be held together by separate silk threads loosely slung around the band and widthwise of the latter. The silk band may also be woven.

I claim:

1. A driving belt entirely of silk.
2. A driving belt of slightly twisted threads of silk reeled adjacent one another.
3. A driving belt of slightly twisted threads of silk and threads loosely slung around the belt crosswise.

In testimony whereof I affix my signature.

HEINRICH ZOELLY.